(12) United States Patent
Shigyou et al.

(10) Patent No.: US 11,674,603 B2
(45) Date of Patent: Jun. 13, 2023

(54) DIAPHRAGM VALVE AND FLOW RATE CONTROL DEVICE

(71) Applicant: FUJIKIN INCORPORATED, Osaka (JP)

(72) Inventors: Kohei Shigyou, Osaka (JP); Takashi Hirose, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 17/275,034

(22) PCT Filed: Sep. 3, 2019

(86) PCT No.: PCT/JP2019/034554
§ 371 (c)(1),
(2) Date: Mar. 10, 2021

(87) PCT Pub. No.: WO2020/066941
PCT Pub. Date: Apr. 2, 2020

(65) Prior Publication Data
US 2022/0057002 A1    Feb. 24, 2022

(30) Foreign Application Priority Data

Sep. 29, 2018 (JP) .............................. JP2018-186187

(51) Int. Cl.
*F16K 7/14* (2006.01)
*F16K 27/00* (2006.01)
(Continued)

(52) U.S. Cl.
CPC ............ *F16K 7/14* (2013.01); *F16K 27/0272* (2013.01); *F16K 31/004* (2013.01); *F16K 27/003* (2013.01)

(58) Field of Classification Search
CPC ..... F16K 7/14; F16K 7/16; F16K 7/17; F16K 25/005; F16K 27/003; F16K 31/004;
(Continued)

(56) References Cited

U.S. PATENT DOCUMENTS 3,806,084 A * 4/1974 Seese ...................... F16K 23/00
                                                                251/63
4,019,534 A * 4/1977 Clements ................. F16K 31/50
                                                                251/368

(Continued)

FOREIGN PATENT DOCUMENTS

CN        101994870        3/2011
CN        104075006        10/2014
(Continued)

OTHER PUBLICATIONS

International Search Report, WIPO, Application No. PCT/JP2019/034554, dated Nov. 19, 2019, English translation thereof.

(Continued)

*Primary Examiner* — Kevin F Murphy
*Assistant Examiner* — Jonthan J. Waddy
(74) *Attorney, Agent, or Firm* — Greenblum & Bernstein P.L.C.

(57) ABSTRACT

A diaphragm valve includes: a valve body having flow paths of fluids formed therein and having a diaphragm-arrangement portion on one surface; a diaphragm arranged in the diaphragm-arrangement portion and can open and close the flow path and adjust the opening degree of by elastic deformation; and a driving unit having a stem for pressing the diaphragm to elastically deform and an actuator for driving the stem, wherein the stem is axially movably held via a resin sleeve by a bonnet fixed to the valve body side.

10 Claims, 5 Drawing Sheets

(51) Int. Cl.
*F16K 31/00* (2006.01)
*F16K 27/02* (2006.01)

(58) Field of Classification Search
CPC ........ F16K 31/007; F16K 31/008; F16K 7/00;
F16K 7/12; F16K 27/0236; F16K
27/0272; F16K 27/048; F16K 27/08
USPC ........................................................ 251/331
See application file for complete search history.

(56) References Cited

U.S. PATENT DOCUMENTS

| | | | | |
|---|---|---|---|---|
| 4,171,792 | A | * | 10/1979 | Bass ....................... F16K 41/12 |
| | | | | 251/225 |
| 4,828,219 | A | * | 5/1989 | Ohmi ....................... F16K 7/14 |
| | | | | 251/118 |
| 4,989,277 | A | * | 2/1991 | Tsutsui .................. F16K 31/007 |
| | | | | 4/406 |
| 6,062,246 | A | | 5/2000 | Tanaka et al. |
| 8,807,014 | B2 | | 8/2014 | Nitta et al. |
| 2010/0294964 | A1 | | 11/2010 | Matsumoto et al. |
| 2011/0042595 | A1 | | 2/2011 | Matsumoto et al. |
| 2013/0273484 | A1 | | 10/2013 | Lefebvre et al. |
| 2014/0290778 | A1 | | 10/2014 | Yasuda et al. |
| 2014/0299201 | A1 | | 10/2014 | Hirose et al. |
| 2016/0131284 | A1 | * | 5/2016 | Matsuyama ............ F16K 17/02 |
| | | | | 137/488 |
| 2018/0240961 | A1 | | 8/2018 | Shigyou et al. |

FOREIGN PATENT DOCUMENTS

| | | |
|---|---|---|
| CN | 204213431 U | 3/2015 |
| JP | 6-66389 A | 3/1994 |
| JP | H11-154022 A | 6/1999 |
| JP | 2003-42324 A | 2/2003 |
| JP | 2014-504355 A | 2/2014 |
| WO | 2012/147477 A1 | 11/2012 |
| WO | 2013/046660 A1 | 4/2013 |
| WO | 2017/033423 A1 | 3/2017 |

OTHER PUBLICATIONS

Written Opinion of the International Searching Authority issued in International Patent Application No. PCT/JP2019/034554, dated Nov. 19, 2019, English translation thereof.
International Preliminary Report on Patentability, Application No. PCT/JP2019/034554, dated Mar. 23, 2021, English translation thereof.
Chinese Office Action, Chinese Patent Application No. 201980064209. 5, dated Jun. 30, 2022, with English translation.

* cited by examiner

[fig.1]
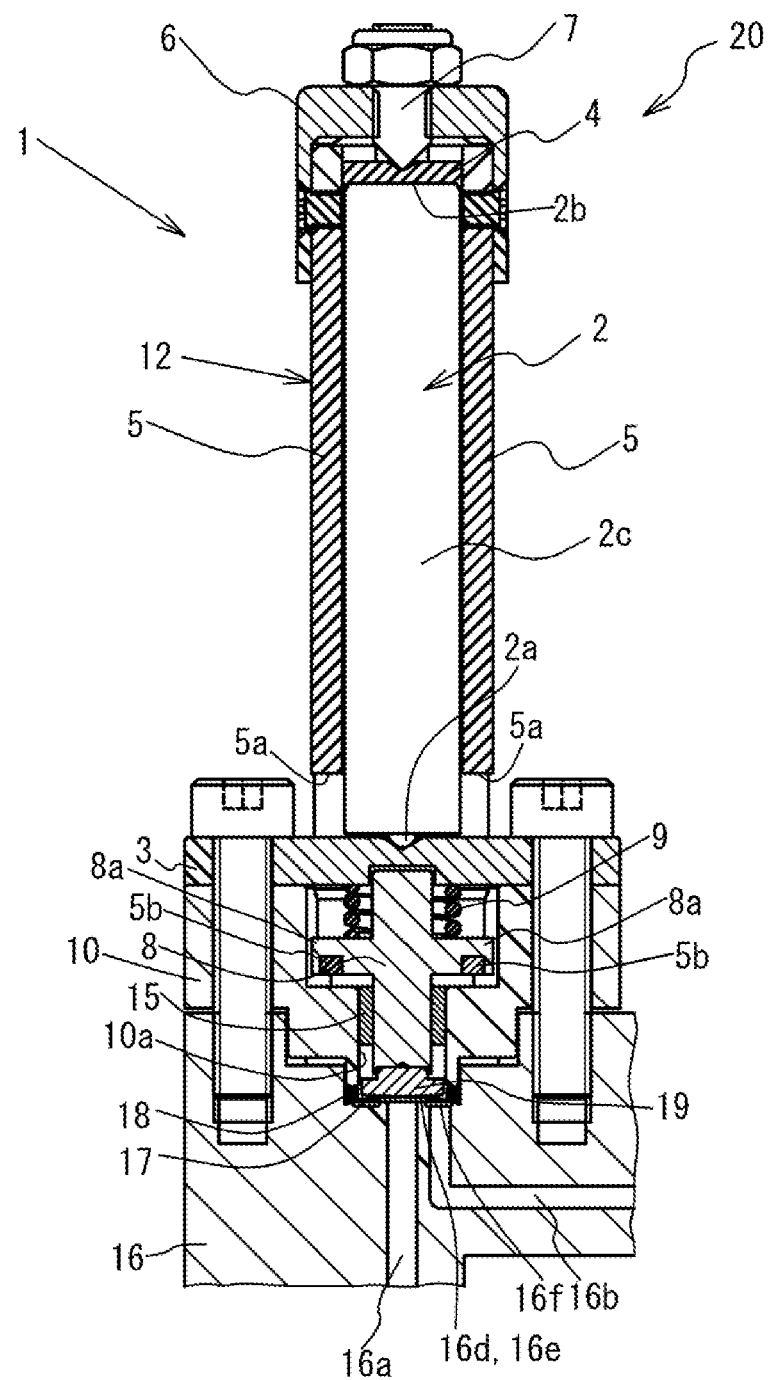

[fig.2]
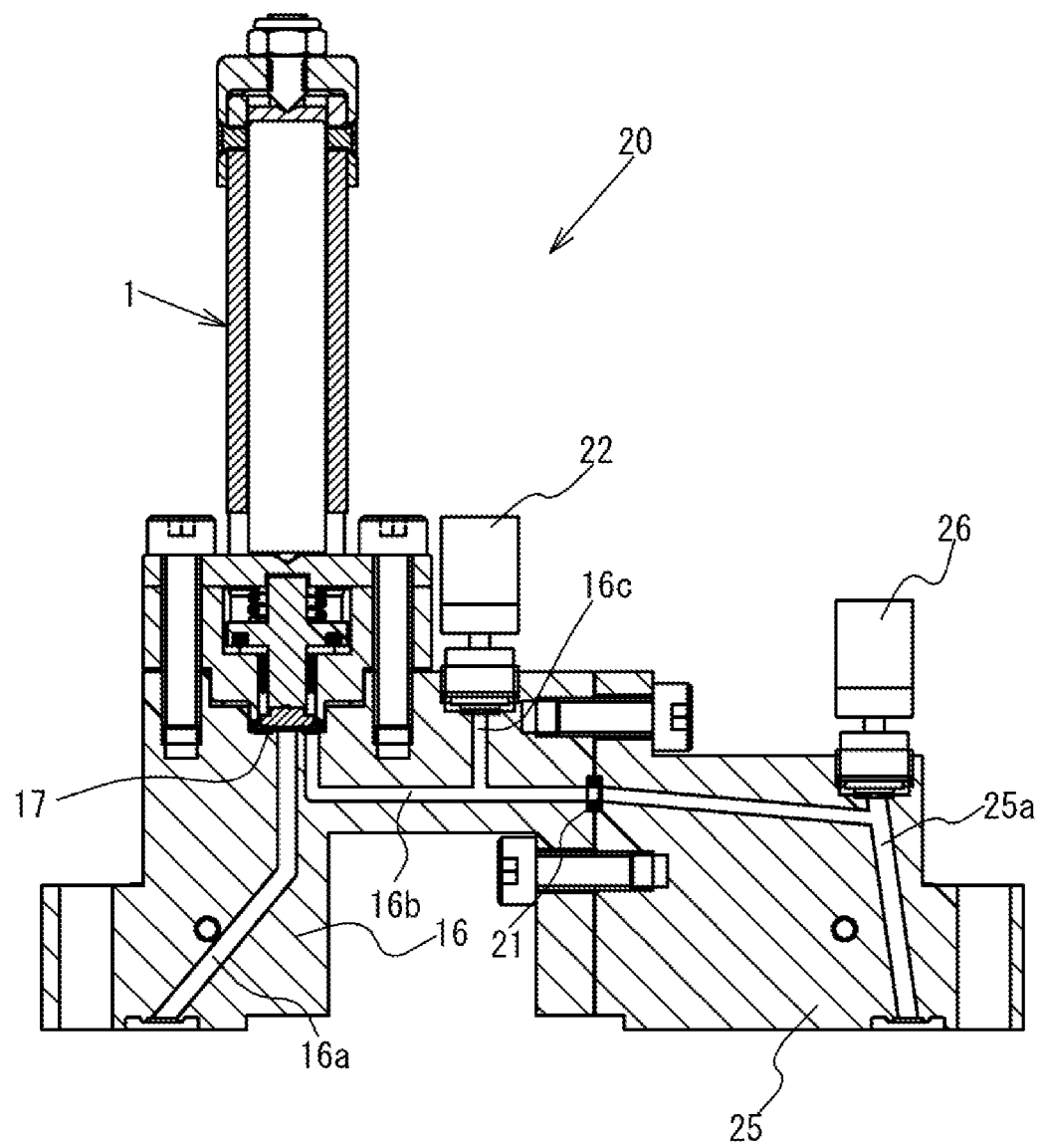

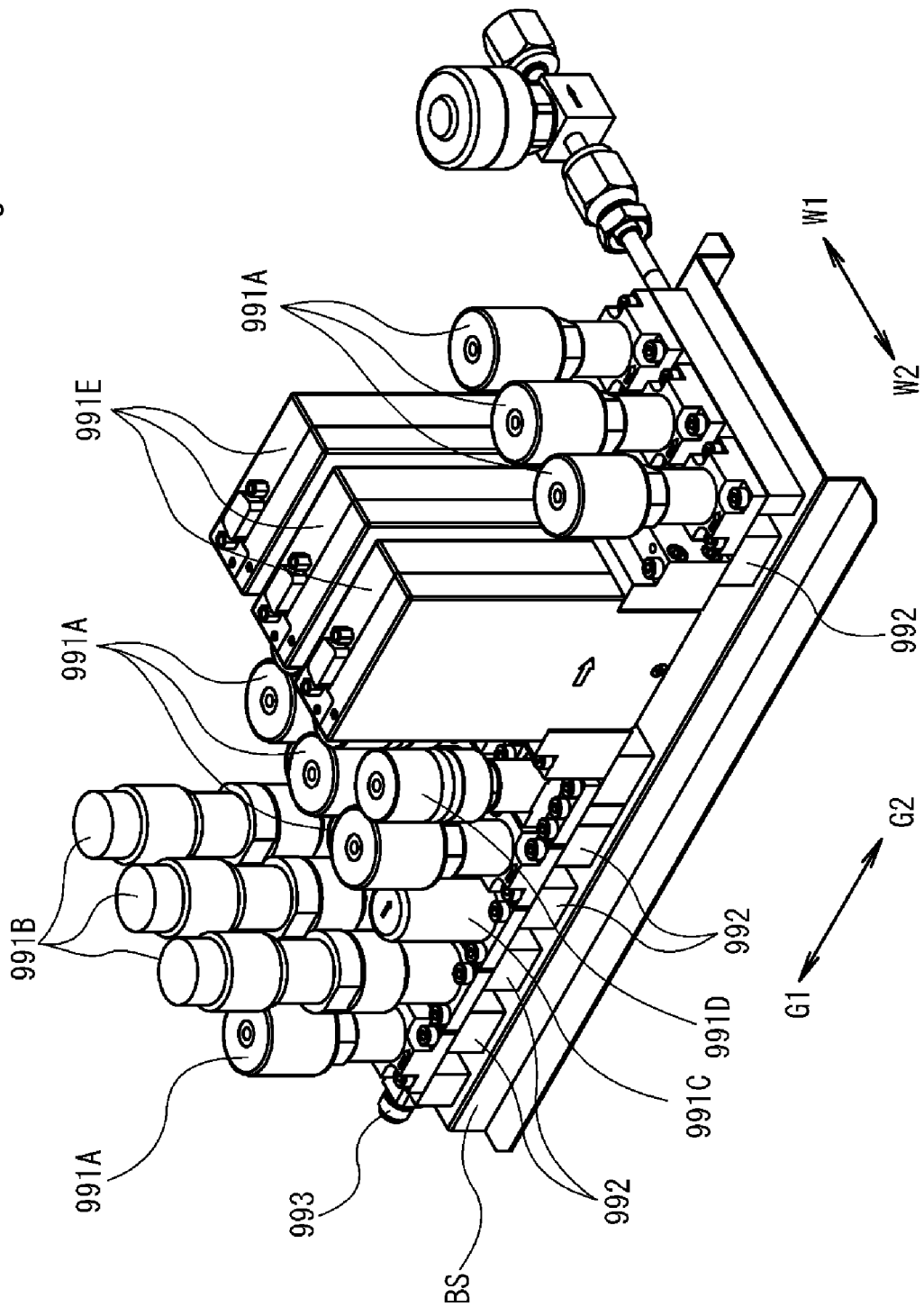
[fig.3]

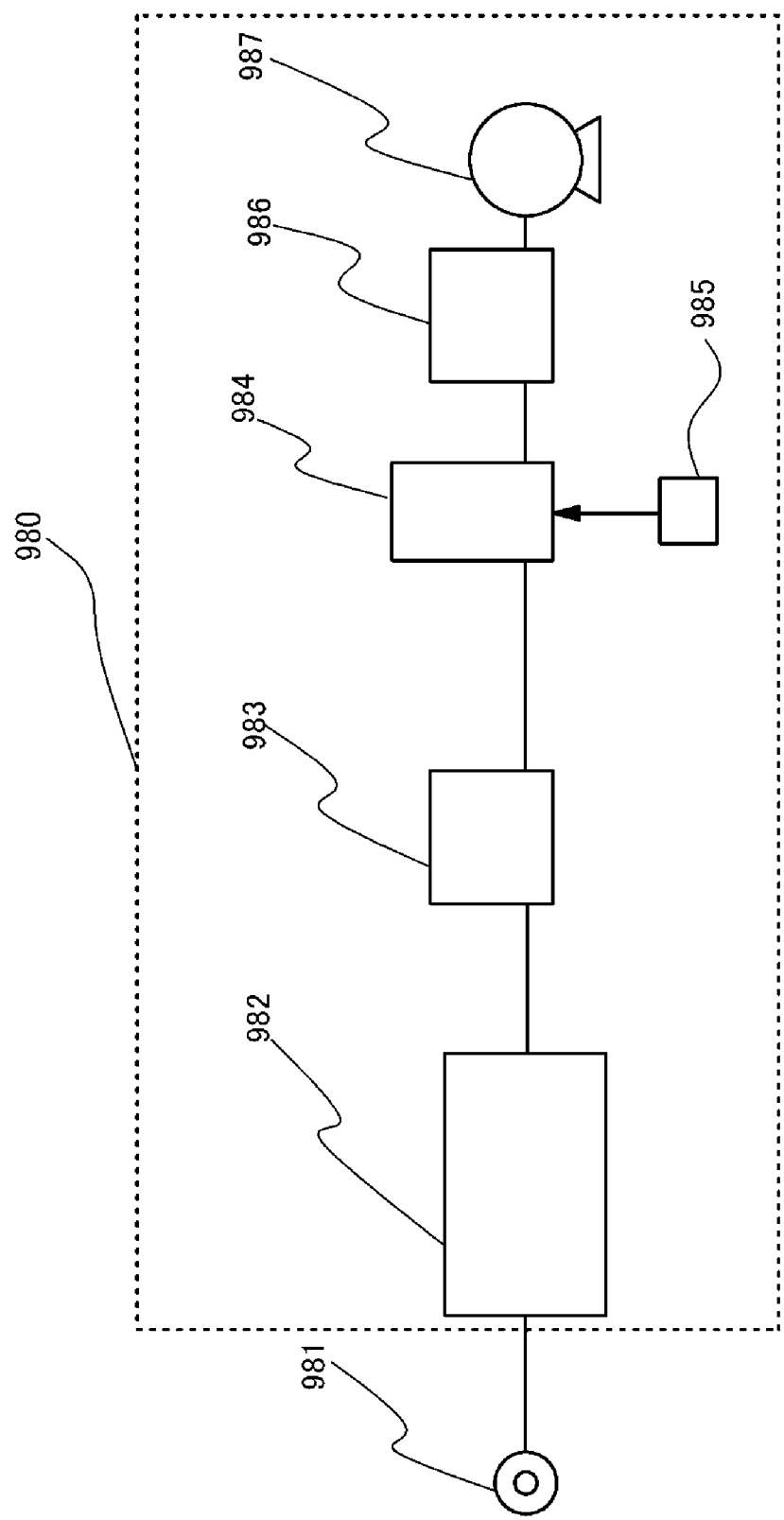
[fig.4]

[fig.5]
Background Art
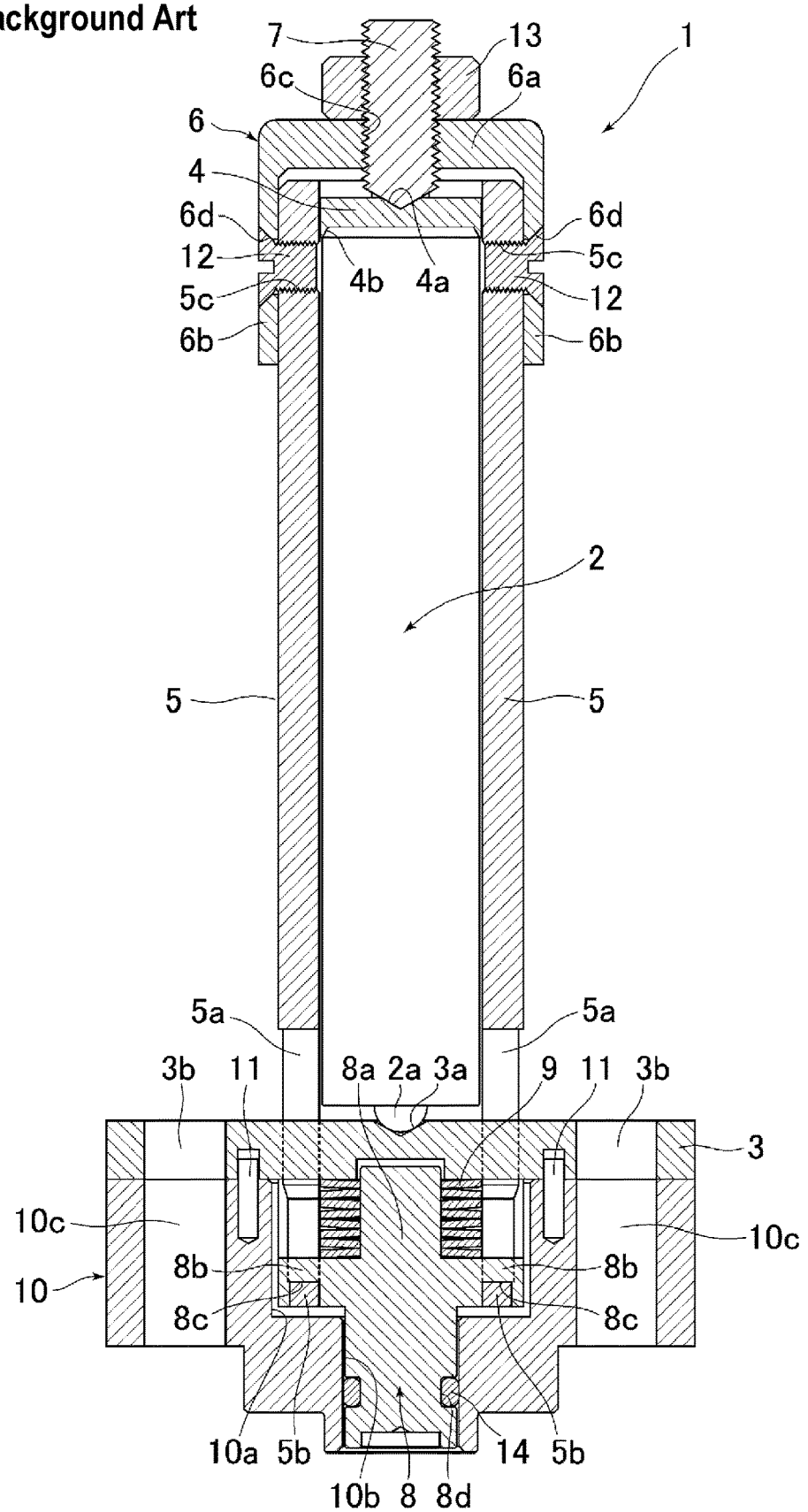

DIAPHRAGM VALVE AND FLOW RATE CONTROL DEVICE

TECHNICAL FIELD

The present invention relates to a diaphragm valve, a flow rate control device, a fluid control device, and a semiconductor manufacturing apparatus.

BACKGROUND ART

For flow control of process gases used in semiconductor manufacturing processes or the like, mass flow controllers are widely used. Such a mass flow controller, for example, in the case of a pressure type mass flow controller, is configured to measure a mass flow rate by using pressures in front and back of an orifice provided in a flow path, and adjust the mass flow rate by a control valve so that the mass flow rate becomes a target value. As such control valves, diaphragm valves are widely used.

The diaphragm valve is structured to elastically deform a diaphragm made of a thin metal plate or the like by pressing it with a driving unit to open and close the flow path and adjust the opening degree. The drive unit includes, for example, as shown in FIG. 5 (FIG. 4 of Patent Literature 1), a stem 8 for pressing the diaphragm (reference numeral 17 in FIG. 1), and a piezoelectric actuator 2 (piezo actuator) for driving it. The stem 8 is driven in a direction to open the valve by the piezoelectric actuator 2 via a displacement transmitting mechanism (4, 7, 6, 5, 5b), it is biased in a direction to close the diaphragm valve by a disc spring 9 when the voltage of the piezoelectric actuator 2 is not applied, and is guided by a through hole 10b of bonnet 10 via an O-ring 14 (Patent Literature 1).

This O-ring 14 is formed of rubber such as nitrile rubber, fluororubber, silicon rubber, or chloroprene rubber, and has flexibility. Since the operating stroke of the stem 8 driven by the piezoelectric actuator 2 is as small as several 10 μm, it is considered that the axial displacement of the stem 8 is allowed by elastic deformation of the O-ring 14 rather than sliding.

PATENT LITERATURE

PTL 1: International Publication No. WO2017/033423A1

SUMMARY OF INVENTION

Technical Problem

However, in the above mechanism, since the contact area of the O-ring as a guide is small, the holding force is insufficient, and there is a case where deflection of the stem occurs. As a result, if the contact point of the diaphragm becomes eccentric, the stress becomes high, and it may cause shortening the life of the diaphragm. Especially, when the diaphragm is miniaturized along with miniaturization of flow rate control devices, even a slight deflection causes a relatively large eccentricity for the diaphragm, and accordingly, more severe suppression of the deflection is required.

An object of the present invention is to solve the above-mentioned problems and to provide a diaphragm valve in which deflection of a stem is reduced.

Solution to Problem

The diaphragm valve of the present invention comprises: a valve body having a flow path formed therein and a diaphragm-arrangement portion on one surface; a diaphragm arranged in the diaphragm-arrangement portion and can open and close the flow path and adjust the opening degree by elastic deformation; and a driving unit having a stem for pressing the diaphragm to elastically deform and an actuator for driving the stem, wherein the stem is axially movably held via a resin sleeve by a bonnet fixed to the valve body side.

Preferably, a configuration may be adopted in which the resin sleeve may be made of any one of polyacetal, ultrahigh molecular weight polyethylene, fluororesin, and phenol resin.

Preferably, the actuator is a piezoelectric actuator.

A flow rate control device of the present invention is one comprising a diaphragm valve having the above configuration.

A fluid control device of the present invention is a fluid control device comprising a plurality of fluid devices arranged from upstream to downstream, wherein the plurality of fluid devices includes a diaphragm valve or a flow rate control device having the above configuration.

A semiconductor manufacturing apparatus of the present invention is one comprising a diaphragm valve or a flow rate control device having the above configuration to control a process gas in a manufacturing process of a semiconductor device requiring a process by the process gas in a sealed chamber.

Advantageous Effects of Invention

According to the present invention, since a resin sleeve is used as a guide portion for guiding the axial movement of the stem for driving the diaphragm, the contact area between the stem and the guide portion is increased, and the guide rigidity can be increased. Thus, a diaphragm valve with reduced deflection of the stem has been realized.

BRIEF DESCRIPTION OF DRAWINGS

FIG. 1 is a schematic cross-sectional view of a diaphragm valve according to an embodiment of the present invention.

FIG. 2 is a schematic cross-sectional view of a flow rate control device according to an embodiment of the present invention.

FIG. 3 is a schematic perspective view of a fluid control device according to an embodiment of the present invention.

FIG. 4 is a block diagram of a semiconductor manufacturing apparatus according to an embodiment of the present invention.

FIG. 5 is a longitudinal sectional view showing a linear actuator portion of a conventional diaphragm valve.

DESCRIPTION OF EMBODIMENTS

Embodiments of the present invention will be described below with reference to the drawings. FIG. 1 shows a schematic diagram of a diaphragm valve 1 according to an embodiment of the present invention.

As shown in FIG. 1, the diaphragm valve 1 of the present embodiment is configured to include a valve body 16, a diaphragm 17, and a driving unit 12.

The valve body 16 has a substantially block shape, and has an upstream flow path 16a and the downstream flow path 16b formed therein. The upstream flow path 16a opens to a central portion of a bottom surface of the diaphragm-arrangement portion 16d which is a shallow counterbore-shaped recess formed in an upper surface of the valve body 16, and the periphery of the opening is raised annularly to form a valve seat 16e. On the other hand, the downstream flow path 16b is open to the peripheral portion of the bottom surface of the diaphragm-arrangement portion 16d.

In the present embodiment, the diaphragm 17 is a spherical shell-shaped member in which the central portion of a metal thin plate such as special stainless steel or a nickel-cobalt alloy thin plate is bulged upward, and is disposed in the diaphragm-arrangement portion 16d on the upper surface of the valve body 16. An annular-shaped pressor adapter 18 is disposed on the outer peripheral edge portion of the diaphragm 17, the lower end portion of a bonnet 10 abuts on the pressor adaptor 6, and the bonnet 10 is fastened together with the support plate 3 to the valve body 16 by bolts, so that the diaphragm 17 is fixed and the diaphragm-arrangement portion 16d is air-tightly sealed.

There is a predetermined amount of gap between the diaphragm 17 and the valve seat 16e, and a flow path is formed in which the upstream side flow path 16a communicates through the gap with the diaphragm-arrangement portion 16d sealed with the diaphragm 17, and further communicates with the downstream side flow path 16b. When the diaphragm 17 is pressed by the driving unit 12 and abuts against the valve seat 16e, the communication between the flow path 16a and the flow path 16b is shut off, and when the diaphragm 17 is isolated from the valve seat 16e, the flow path 16a communicates with the flow path 16b. This makes it possible to open and close the flow path and adjust the opening degree.

The driving unit 12 includes a bonnet 10, a support plate 3, a piezoelectric actuator 2, a displacement transmitting mechanism (4, 7, 6, 5, 5b), a stem 8, and a disc spring 9.

The bonnet 10 and the support plate 3 hold the piezoelectric actuator 2, the displacement transmitting mechanism (4, 7, 6, 5, 5b) and the stem 8 so as to be movable in the axial direction. The support plate 3 is put on the bonnet 10, and they are fastened together with the valve body 16 with two bolts. The bonnet 10 also serves to secure the diaphragm 17 to the valve body 16 as described above.

The piezoelectric actuator 2 incorporates stacked piezoelectric elements (not shown) in a cylindrical case 2c. The case 2c is made of a metal such as stainless steel alloy, and the end faces of the hemispherical tip end portion 2a side and a base end portion 2b side are closed. In the case 2c, by applying a voltage to the stacked piezoelectric elements and thereby extending them, the end face of tip end portion 2a side of the case 2c is elastically deformed, and the hemispherical tip end portion 2a is displaced in the longitudinal direction. That is, in the case 2c, by applying a voltage to the laminated piezoelectric elements, the total length from tip end portion 2a to the base end portion 2b is extended.

The piezoelectric actuator 2 is arranged in the vertical direction so that the tip end portion 2a abuts on the support plate 3. The tip end of tip end portion 2a forms a hemispherical shape, and in the present embodiment, it is adapted to drop into a conical recess formed in the upper surface of the support plate. The base end portion 2b of the piezoelectric actuator 2 is fitted and held in a pressing member 4 which is a receiving portion of the displacement transmitting mechanism (4, 7, 6, 5, 5b).

The upper surface of the pressing member 4 is in contact with the distal end of an adjusting screw 7 which is screwed into a screw hole of an upper connecting member 6. The upper connecting member 6 has a substantially U-shape formed by cutting both sides of a faced-down bottomed cylinder, and to the inside thereof, a pair of displacement transmitting members is connected by screws.

The pair of displacement transmitting members 5 is made of a metal material such as an inver material having a small thermal expansion coefficient, and has a shape formed by preparing a cylindrical member fitted the outer peripheral surface of the piezoelectric actuator 2 and slitting the cylindrical member along the longitudinal direction into two. This pair of displacement transmitting members 5 have respective openings 5a into which the support plate 3 is inserted, and their lower portions each extends downwardly and forms a locking portion 5b in the tip end portion.

On the other hand, the stem 8 is disposed coaxially with the piezoelectric actuator 2 on the lower side of the support plate 3 through a guide hole 10a of the bonnet 10, the stem 8 is guided by the guide hole 10a and is provided axially movably. The stem 8 includes arm portions 8a with which the locking portions 5b formed in the lower end portions of the pair of displacement transmitting members 5s are engaged, respectively. The stem 8 is biased downward by a disc spring 9. When the piezoelectric actuator 2 is extended, the stem 8 is also pulled upward by a pair of displacement transmitting members 5 against the biasing force of the disc spring 9. Thus, the displacement of the length of the piezoelectric actuator 2 is transmitted to the stem through a series of displacement transmitting mechanisms (4, 7, 6, 5, 5b), so that the stem is moved axially.

A diaphragm presser 19 is attached to the tip (lower end) of the stem 8 and is in contact with the diaphragm 17.

Here, in the present invention, a resin sleeve 15 is used for a sliding portion between the stem 8 and the guide hole 10a of the bonnet 10 instead of the conventional O-ring 14 (see FIG. 5). That is, the stem 8 is guided by the inner periphery of the sleeve 15 whose outer periphery is fitted and fixed to the guide hole 10a of the bonnet 10. Since the sleeve 15 is formed of a self-lubricating resin such as polyacetal, ultra-high molecular weight polyethylene, fluororesin, Teflon (registered trademark) resin, or phenol resin, the coefficient of friction with the stem 8 made of stainless steel to be guided is small. Further, the combination of the outer periphery of the stem 8 and the inner periphery of the sleeve 15 has a cylindrical contact surface, so that the contact area is wide, and high guide rigidity is obtained.

Next, the operation of the diaphragm valve 1 of the present embodiment thus configured will be described with reference to FIG. 1.

First, in the initial condition where the applied voltage to the piezoelectric actuator 2 is zero, the length of the piezoelectric actuator 2 is the initial length, and the displacement transmitting mechanism (4, 7, 6, 5, 5b) and the stem 8 engaged therewith are pushed down by the disc spring 9 and are in the lowermost position. Therefore, the diaphragm 17 is pressed by the stem 8 and comes into close contact with the valve seat 16e, so that the valve is fully closed state.

Next, when a voltage is applied to the piezoelectric actuator 2, the length of the piezoelectric actuator 2 is increased, overcoming the biasing force of the disc spring 9, the displacement transmitting mechanism (4, 7, 6, 5, 5b) and the stem 8 are pushed up, a gap is formed between the diaphragm 17 and the valve seat 16e, the valve opens, and the fluid can pass through the diaphragm valve 1. By adjusting the applied voltage to the piezoelectric actuator 2, the gap between the diaphragm 17 and the valve seat 16e can be adjusted, and the flow rate of the fluid can be adjusted.

At this time, since the outer periphery of the stem 8 is guided by the resin sleeve 15 having a low friction coefficient, the stem 8 can be moved in the vertical direction smoothly. Further, since the resin sleeve 15 has a high guide rigidity, it is possible to prevent the deflection at the time of vertical movement to thereby reduce the stress increase of the diaphragm 17 due to the deflection, so that the life of the diaphragm 17 can be improved.

In the present embodiment, the outer periphery of the stem 8 is slid on the inner periphery of the resin sleeve 15 whose outer periphery is fitted to the guide hole 10*a* of the bonnet 10, but it is not limited to this, and the outer periphery of the resin sleeve 15 whose inner periphery is fitted to the outer periphery of the stem 8 may be slid on the inner periphery of the guide hole 10*a* of the bonnet 10. Even in such a configuration, low friction coefficient and high guide rigidity are obtained.

Next, a flow rate control device of the present invention will be described.

FIG. 2 is a schematic cross-sectional view of a flow rate control device according to an embodiment of the present invention, and shows a pressure type flow rate control device 20 in which the diaphragm valve 1 described above is incorporated.

In FIG. 2, a cover for covering the entire flow rate control device 20 and a feedback control board actually exist, but they are not shown for convenience of explanation.

The flow rate control device 20 includes a downstream side block 25, a pressure detector 22, an orifice 21, a pressure detector 26, and a flow path 25*a* in addition to the above-described components of the diaphragm valve 1.

Inside the valve body 16, an orifice 21 (in the present embodiment, a gasket-type orifice) is provided in the flow path on the downstream side of the diaphragm 17. In the middle of the flow path 16*b* on the upstream side of the orifice 21, an upstream pressure detector 22 for detecting the pressure is provided.

The downstream side block 25 is connected to the valve body 16 by bolts and has a downstream flow path 25*a* that communicates with the downstream flow path 16*b* of the valve body 16, and a downstream pressure detector 26 for detecting the pressure in the downstream flow path 25*a* is provided.

By a control device (not shown), the diaphragm valve 1 is controlled to open and close by a PID control based on the detected values of the pressure detectors 22 and 26.

In this flow rate control device, since the diaphragm valve of the present invention is used, the life of the fluid control device can be expected to be extended along with extension of the life of the diaphragm valve.

Next, a fluid control device of the present invention will be explained.

FIG. 3 is a schematic perspective view of the fluid control device according to an embodiment of the present invention.

The fluid control device shown in FIG. 3 is provided with a metallic baseplate BS arranged along the widthwise directions W1, W2 and extending in the longitudinal directions G1, G2. Note that W1 represents the front side, W2 represents the back side, G1 represents the upstream side, and G2 represents the downstream side. Various fluid devices 991A to 991E are installed on the baseplate BS via a plurality of flow path blocks 992, and a flow path (not shown) through which fluid flows from the upstream side G1 to the downstream side G2 is formed in the plurality of flow path blocks 992.

Here, a "fluid device" is a device used in a fluid control device for controlling the flow of a fluid, the fluid device comprises a body defining a fluid flow path and has at least two flow path ports opening at the surfaces of the body. Specifically, the fluid devices include open/close valves (2-way valves) 991A, regulators 991B, pressure gauges 991C, open/close valves (3-way valves) 991D, mass flow controllers 991E, and the like, but not limited thereto. An inlet tube 993 is connected to an upstream flow path port of a flow path (not shown).

The present invention can be applied to various diaphragm valves such as the above-described open/close valves 991A and 991D, regulators 991B, and mass flow controllers 991E.

Next, a semiconductor manufacturing apparatus of the present invention will be explained.

FIG. 4 is a block diagram of a semiconductor manufacturing apparatus according to an embodiment of the present invention.

The semiconductor manufacturing apparatus 980 shown in FIG. 4 is an apparatus for performing a semiconductor manufacturing process by an atomic layer deposition method (ALD: Atomic Layer Deposition method), where 981 denotes a process gas source, 982 denotes a gas box (fluid control device), 983 denotes a tank, 984 denotes an open-close valve, 985 denotes a control unit, 986 denotes a process chamber, and 987 denotes an exhaust pump.

The present invention is applicable to the above-described gas box 982 and fluid devices constituting the gas box 982 and the open-close valve 984.

Note that the present invention is not limited to the above-described embodiment. Various additions, modifications, and the like can be made by those skilled in the art within the scope of the present invention. For example, in the above application example, the case where the present invention is used in the semiconductor manufacturing process by the ALD method is exemplified, but the present invention is not limited to this, and the present invention can be applied to any object requiring precise flow rate control, such as an atomic layer etching (ALE: Atomic Layer Etching method).

In the above embodiment, the open-close valve 984 is configured to be disposed outside the gas box 982 as a fluid control device, but it is also possible to include the diaphragm valve of the above embodiment in the fluid control device in which various fluid devices such as an open-close valve, a regulator, and a mass flow controller are integrated and housed in a box.

REFERENCE SIGNS LIST

1: Diaphragm valve
2: Piezoelectric actuator
2*a*: Tip end portion
2*b*: Base end portion
2*c*: Case
3: Support plate
4: Pressing member
5: Displacement transmitting member
6: Upper connecting member
7: Adjusting screw
8: Stem
8*a*: Arm portion
9: Disc spring
10: Bonnet
10*a*: Guide hole
10*b*: Through hole
12: Driving unit
14: O-ring
15: Sleeve
16: Valve body
16*a*: Upstream side flow path
16*b*: Downstream side flow path
16*d*: Diaphragm-arrangement portion 16e: Valve seat
17: Diaphragm
18: Presser adapter
19: Diaphragm presser
20: Flow rate control device
21: Orifice
22: Pressure detector
25: Downstream side block
25a: Downstream flow path
26: Pressure detector
980: Semiconductor manufacturing apparatus
981: Process gas source
982: Gas box
983: Tank
984: open-close valve
985: Control unit
986: Process chamber
987: Exhaust pump
991A~991E: Fluid device
992: Flow path blocks
993: Inlet tube
BS: Base plate
G1, G2: Longitudinal direction
W1, W2: Width direction

The invention claimed is:

1. A diaphragm valve comprising:
   a valve body including a flow path formed therein and a diaphragm-arrangement portion on one surface;
   a diaphragm arranged in the diaphragm-arrangement portion and configured to open and close the flow path and adjust an opening degree by elastic deformation;
   a driver including a stem to press the diaphragm to elastically deform the diaphragm, and an actuator to drive the stem; and
   a spring that is disposed to exert a biasing force on the stem;
   wherein the actuator is a piezoelectric actuator,
   wherein the stem is axially movably held via a resin sleeve by a bonnet fixed to the valve body,
   wherein the stem includes at least one arm portion that projects from the stem transverse to a direction of axial movement of the stem,
   wherein the at least one arm portion is sandwiched between the spring and the resin sleeve in the direction of the axial movement of the stem,
   wherein a lower end of the stem is attached to a diaphragm presser,
   wherein the diaphragm presser includes an outer peripheral portion that projects outward relative to an outer periphery of a part of the stem that is disposed below the at least one arm portion,
   wherein the resin sleeve is sandwiched between the at least one arm portion and the outer peripheral portion of the diaphragm presser, and
   wherein an entirety of the part of the stem that is located below the at least one arm portion is disposed without being surrounded by a deformable O-ring.

2. The diaphragm valve according to claim 1, wherein the resin sleeve is made of any one of polyacetal, ultrahigh molecular weight polyethylene, fluororesin, and phenol resin.

3. A flow rate control device comprising the diaphragm valve as defined in claim 1.

4. A fluid control device comprising a plurality of fluid devices,
   the plurality of fluid devices including the diaphragm valve as defined in claim 1.

5. The diaphragm valve according to claim 1, wherein when the actuator is actuated, the stem is driven against the biasing force that is applied on an upper surface of the at least one arm portion.

6. The diaphragm valve according to claim 5, further comprising a support plate that is fixed to an upper end of the bonnet.

7. The diaphragm valve according to claim 6, wherein the spring is sandwiched between the upper surface of the at least one arm portion and the support plate.

8. The diaphragm valve according to claim 1, further comprising a container that at least partially houses the actuator, wherein
   the container includes one end connected to the actuator, and another end opposite to the one end that is connected to the at least one arm portion, and
   when the actuator is actuated, the actuator displaces the container so that the container transmits a displacement of the actuator to the stem to drive the stem.

9. A diaphragm valve comprising:
   a valve body including a flow path formed therein and a diaphragm-arrangement portion on one surface;
   a diaphragm arranged in the diaphragm-arrangement portion and configured to open and close the flow path and adjust an opening degree by elastic deformation;
   a driver including a stem to press the diaphragm to elastically deform the diaphragm, and an actuator to drive the stem; and
   a spring that is disposed to exert a biasing force on the stem;
   wherein the stem is axially movably held via a resin sleeve by a bonnet fixed to the valve body,
   wherein the stem includes at least one arm portion that projects from the stem transverse to a direction of axial movement of the stem,
   wherein the at least one arm portion is sandwiched between the spring and the resin sleeve in the direction of the axial movement of the stem,
   wherein a lower end of the stem is attached to a diaphragm presser,
   wherein the diaphragm presser includes an outer peripheral portion that projects outward relative to an outer periphery of a part of the stem that is disposed below the at least one arm portion,
   wherein the resin sleeve is sandwiched between the at least one arm portion and the outer peripheral portion of the diaphragm presser,
   wherein an entirety of the part of the stem that is located below the at least one arm portion is disposed without being surrounded by a deformable O-ring,
   wherein when the actuator is actuated, the stem is driven against the biasing force that is applied on an upper surface of the at least one arm portion,
   wherein the diaphragm valve further comprises a support plate that is fixed to an upper end of the bonnet, and
   wherein the spring is sandwiched between the upper surface of the at least one arm portion and the support plate.

10. A diaphragm valve comprising:
    a valve body including a flow path formed therein and a diaphragm-arrangement portion on one surface;
    a diaphragm arranged in the diaphragm-arrangement portion and configured to open and close the flow path and adjust an opening degree by elastic deformation;
    a driver including a stem to press the diaphragm to elastically deform the diaphragm, and an actuator to drive the stem;

a container that at least partially houses the actuator; and a spring that is disposed to exert a biasing force on the stem;

wherein the stem is axially movably held via a resin sleeve by a bonnet fixed to the valve body, wherein the stem includes at least one arm portion that projects from the stem transverse to a direction of axial movement of the stem, wherein the at least one arm portion is sandwiched between the spring and the resin sleeve in the direction of the axial movement of the stem, wherein a lower end of the stem is attached to a diaphragm presser, wherein the diaphragm presser includes an outer peripheral portion that projects outward relative to an outer periphery of a part of the stem that is disposed below the at least one arm portion, wherein the resin sleeve is sandwiched between the at least one arm portion and the outer peripheral portion of the diaphragm presser, wherein an entirety of the part of the stem that is located below the at least one arm portion is disposed without being surrounded by a deformable O-ring, wherein the container includes one end connected to the actuator, and another end opposite to the one end that is connected to the at least one arm portion, and when the actuator is actuated, the actuator displaces the container so that the container transmits a displacement of the actuator to the stem to drive the stem.

* * * * *